(12) United States Patent
Andras

(10) Patent No.: US 6,648,560 B2
(45) Date of Patent: Nov. 18, 2003

(54) CUTTING INSERT

(75) Inventor: Linn R. Andras, Ligonier, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 09/934,811

(22) Filed: Aug. 22, 2001

(65) Prior Publication Data

US 2003/0039518 A1 Feb. 27, 2003

(51) Int. Cl.$^7$ .......................... B23B 27/04; B23B 15/28
(52) U.S. Cl. ...................................... 407/109; 407/117
(58) Field of Search ........................... 407/110, 113, 407/114, 116, 109, 117

(56) References Cited

U.S. PATENT DOCUMENTS

| | | | |
|---|---|---|---|
| 3,125,798 A | 3/1964 | Stein | 29/98 |
| 3,653,107 A | 4/1972 | Hertel | 29/96 |
| 3,705,447 A * | 12/1972 | Kollar | 407/120 |
| 3,802,042 A | 4/1974 | Novkov | 29/96 |
| 4,462,725 A | 7/1984 | Satran et al. | 407/92 |
| 4,969,779 A | 11/1990 | Barten | 407/114 |
| 4,992,008 A * | 2/1991 | Pano | 407/114 |
| 4,993,893 A * | 2/1991 | Niebauer | 407/113 |
| 5,074,720 A * | 12/1991 | Loqvist et al. | 407/114 |
| 5,082,401 A * | 1/1992 | Niebauer | 407/114 |
| 5,122,017 A * | 6/1992 | Niebauer | 407/114 |
| 5,156,502 A | 10/1992 | Satran | 407/110 |
| 5,209,611 A | 5/1993 | Drescher | 407/48 |
| 5,375,948 A * | 12/1994 | Lindstedt | 407/116 |
| 5,469,902 A | 11/1995 | Sharp et al. | 144/241 |
| 5,741,095 A * | 4/1998 | Charron et al. | 407/113 |
| 5,772,366 A * | 6/1998 | Wiman et al. | 407/114 |
| 5,800,100 A | 9/1998 | Krenzer | 408/224 |
| 5,829,924 A | 11/1998 | Oshnock et al. | 407/110 |
| 5,975,812 A | 11/1999 | Friedman | 407/114 |
| 6,039,515 A * | 3/2000 | Lamberg | 407/113 |

FOREIGN PATENT DOCUMENTS

| | | |
|---|---|---|
| EP | 0150901 | 8/1985 |
| GB | 2152407 | 8/1985 |
| SU | 1006072 | 3/1983 |

* cited by examiner

Primary Examiner—A. L. Wellington
Assistant Examiner—Brian D. Walsh
(74) Attorney, Agent, or Firm—Larry R. Meenan

(57) ABSTRACT

A cutting insert includes a generally polygonal body having minor flank faces, major flank faces, chip breaking faces, major cutting edges formed at the intersection of the first faces and the major flank faces, and minor cutting edges formed at the intersection of the first faces and the minor flank faces. The major cutting edges are generally orthogonal to each other such that each major cutting edge can be alternately exposed for use. In one embodiment, both the major and minor cutting edges are generally linear. In another embodiment, the major cutting edges are generally curvilinear and the minor cutting edges are generally linear.

14 Claims, 10 Drawing Sheets

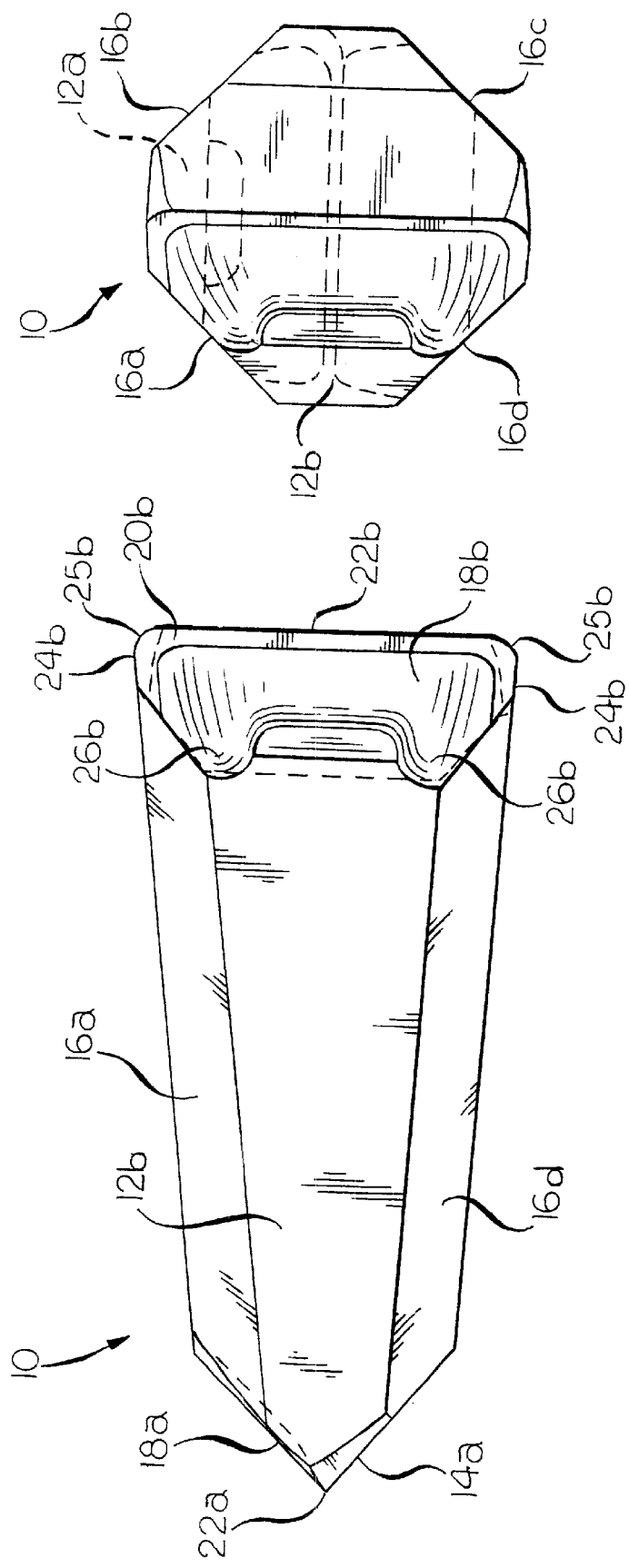

CUTTING INSERT

BACKGROUND OF THE INVENTION

1. Field of the Invention

The invention pertains to a cutting insert which is detachably secured to a tool holder, and in particular to an indexable cutting insert having a plurality of cutting edges which can be used for both a parting or grooving operation and a lateral turning operation.

2. Description of the Related Art

Cutting tools comprising a cutting insert which is detachably secured to a tool holder are well known in the art. Such cutting inserts may be used in parting or grooving operations and lateral turning operations. In a parting or grooving operation, the tool moves in a radial or transverse direction into the rotating workpiece to be grooved or parted. In the lateral turning operation, the tool moves in a lateral direction.

Traditionally, a distinction has been made between using cutting inserts for parting or grooving operations and for lateral turning operations. Specifically, it has been necessary to replace the holder and the cutting insert when switching from a parting or grooving operation to a lateral turning operation, and vice versa. This necessity of switching cutting inserts is clearly time consuming and requires the ready availability of different kinds of holders and cutting insert for each type of operation. Thus, it would be desirable to provide a cutting insert that can be used for both parting and grooving operations and also for lateral turning operations.

SUMMARY OF THE INVENTION

An object of the invention is to provide a cutting insert capable of performing both parting or grooving operations and lateral turning operations.

Another object of the invention is to provide a cutting insert in which the cutting edges can be alternatively used in the tool holder.

To achieve these and other objects of the invention, one aspect of the invention comprises a cutting insert including a generally polygonal body having minor flank faces, major flank faces, chip breaking faces, first faces, major cutting edges formed at the intersection of the first faces and the major flank faces, and minor cutting edges formed at the intersection of the first faces and the minor flank faces. The major cutting edges are orthogonal to each other such that each major cutting edge can be alternately exposed for use.

In another aspect of the invention, a cutting tool comprises a cutting insert including a generally polygonal body having minor flank faces, major flank faces, chip breaking faces, first faces, major cutting edges formed at the intersection of the first faces and the major flank faces, and minor cutting edges formed at the intersection of the first faces and the minor flank faces, wherein the major cutting edges are orthogonal to each other such that each major cutting edge can be alternately exposed for use, and a tool holder including a pair of jaws having surfaces defining a retaining slot therebetween, wherein one of the major cutting edges of the insert is held in the retaining slot at a presentation angle of at least 25 degrees with respect to a longitudinal axis of the insert.

BRIEF DESCRIPTION OF THE DRAWINGS

Further features of the present invention, as well as the advantages derived therefrom, will become clear from the following detailed description made with reference to the drawings in which:

FIGS. 1–4 are perspective views of a cutting insert in accordance with the invention.

DESCRIPTION OF THE PREFERRED EMBODIMENT

Figure 1:
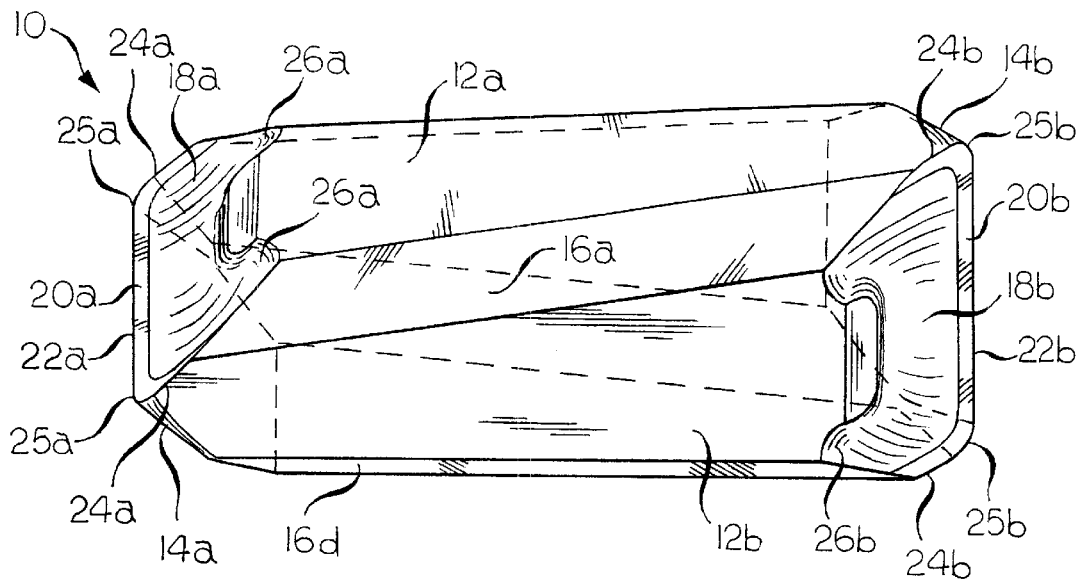
Figure 2:
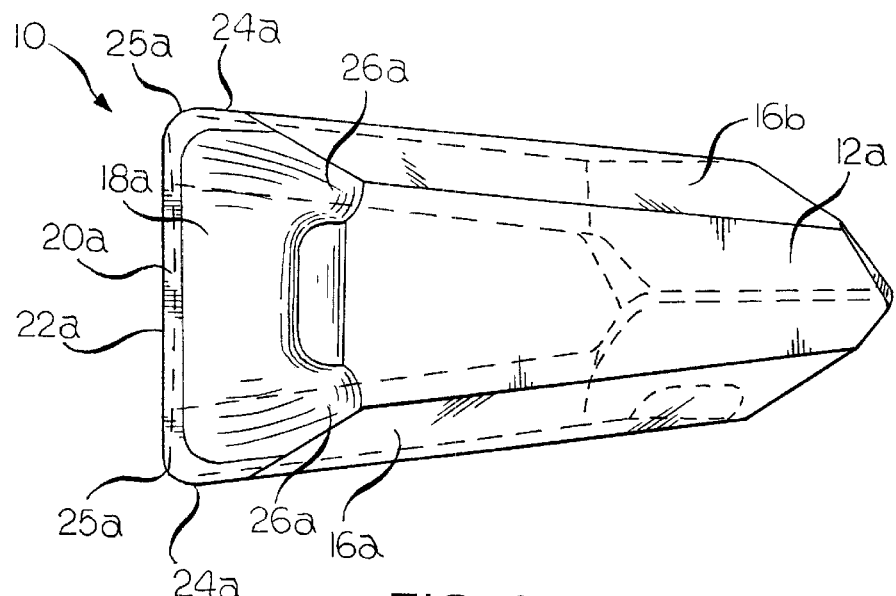
Figure 5:
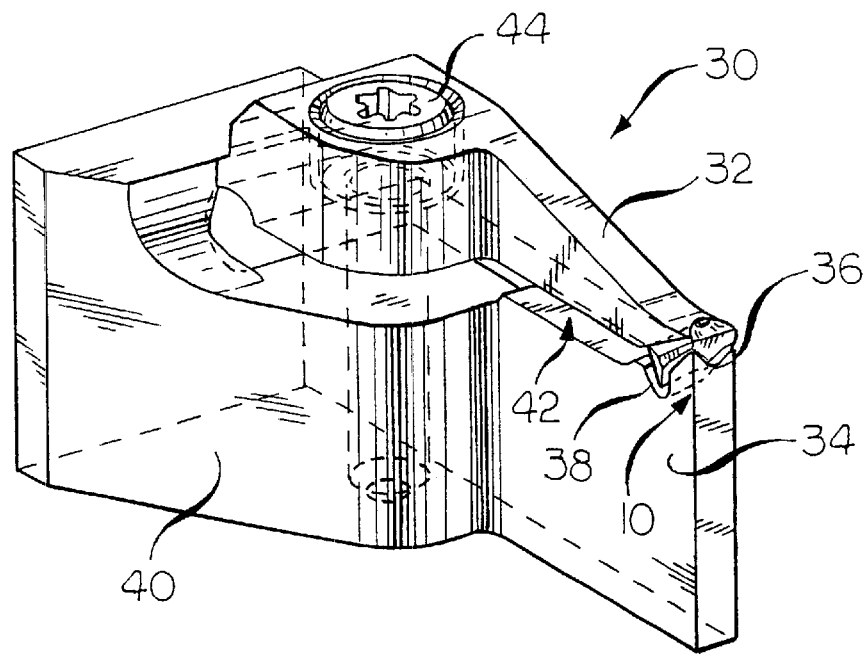
FIGS. 5–8 are perspective views of the cutting insert in accordance with the invention clamped in a tool holder.
Figure 6:
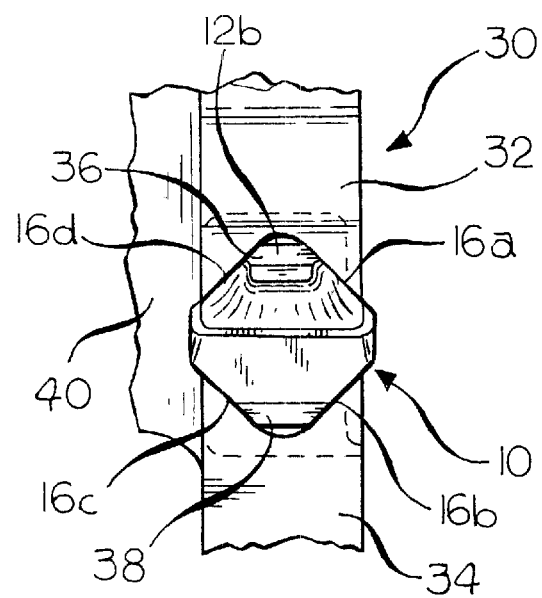

One embodiment of a cutting insert 10 is shown in FIGS. 1–4. The cutting insert 10 comprises a generally polygonal body having generally planar minor flank faces 12a, 12b, generally planar major flank faces 14a, 14b, generally planar seating/clamping faces 16a–d, generally curved chip breaking faces 18a, 18b, and generally planar first faces 20a, 20b. The clamping faces 16a–d are bounded between corresponding minor flank faces 12a, 12b and chip breaking faces 18a, 18b. Generally planar is should be understood to mean exactly planar and not exactly planar to account for minor deviations.

At the intersection of the first faces 20a, 20b and the major flank faces 14a, 14b are formed major cutting edges 22a, 22b, respectively. The major cutting edges 22a, 22b are substantially linear and identical construction. Preferably, the major cutting edges 22a, 22b are not in the same plane and are formed approximately orthogonal to each other such that each major cutting edge 22a, 22b can be alternately exposed for use. In other words, a plane passing through one of the major cutting edges 22a, 22b is approximately orthogonal to a plane passing through the other one of the major cutting edges 22a, 22b. However, it will be appreciated that the major cutting edges 22a, 22b need not be orthogonal to each other, and that the invention can be practiced with any number of cutting edges at any desired angle with respect to each other.

Formed at the intersection of the first faces 20a, 20b and the minor flank faces 12a, 12b are formed minor cutting edges 24a, 24b, respectively. Corners 25a, 25b are located between the major cutting edges 22a, 22b and the minor cutting edges 24a, 24b. In other words, the major cutting edges 22a, 22b extend between the corners 25a, 25b, respectively. The minor cutting edges 24a, 24b extend from insert corners 25a, 25b to an intermediate position along the insert 10. The intermediate position can be any desired position along the insert 10. Preferably, the minor cutting edges 24a, 24b are substantially coplanar with the major cutting edges 22a, 22b. In other words, a plane passing through one of the major cutting edges 22a, 22b also passes through the corresponding minor cutting edges 24a, 24b. However, it will be appreciated that the minor cutting edges 24a, 24b need not be coplanar with the major cutting edges 22a, 22b, and that the invention can be practiced with the minor cutting edges positioned at any desired plane with respect to the major cutting edges.

Each chip breaking face 18a, 18b is bounded between a corresponding minor flank face 12a, 12b, pair of clamping faces 16a–d, first face 20a, 20b, and pair of minor cutting edges 24a, 24b. Each chip breaking face 18a, 18b includes upwardly rising chip deflecting surfaces 26a, 26b, respectively. The chip deflecting surfaces 26a, 26b extend away from the first face 20a, 20b and toward and/or adjacent to the minor flank face 12a, 12b. The chip deflecting surfaces 26a, 26b assist in curling and breaking the chip as the chip flows over the chip breaking face 18a, 18b.

Referring now to FIGS. 5–8, the insert 10 can be clamped in a tool holder, shown generally at 30. The tool holder 30 includes a pair of upper and lower jaws 32 and 34 having respective V-shaped clamping surfaces 36 and 38 formed integrally with a tool holder body 40. The surfaces 36 and 38 in part define a receiving slot 42 for receiving the insert 10.

In order to maintain a high level of accuracy during machining operations, it is necessary to both positively position the insert 10 in the tool holder 30 during installation and to maintain the insert 10 securely within the tool holder 30 during the machining operation. To this end, the insert 10 is firmly clamped within the receiving slot 42 by means of a clamping screw 44. When tightened, the clamping screw 44 causes the clamping surfaces 36 and 38 of the jaws 32 and 34 to bear against the corresponding seating/clamping faces 16a–d. Alternatively, a bore (not shown) passing through the insert may also be used in conjunction with a clamping screw to securely position the insert 10 within the receiving slot 42.

Figure 7:
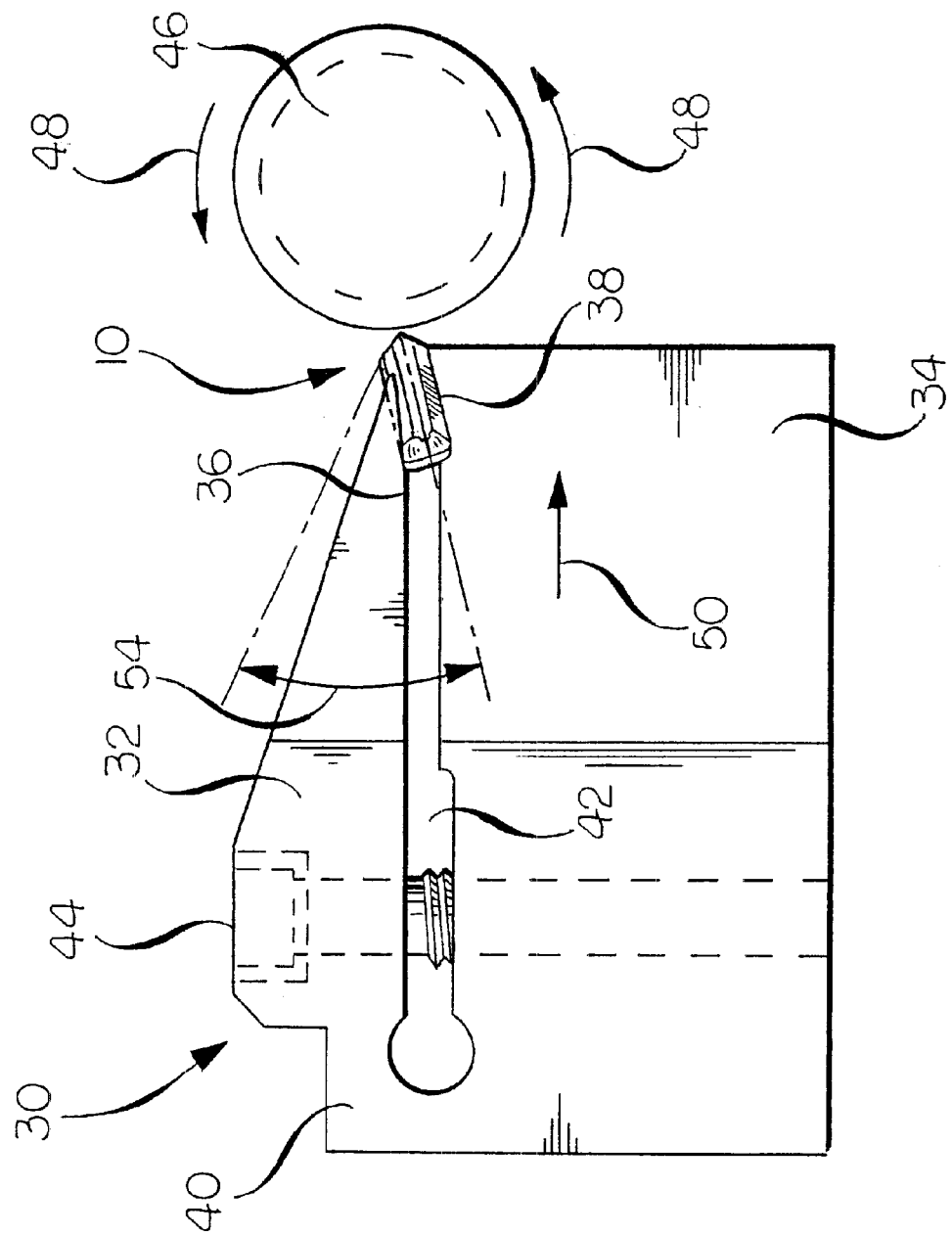
Figure 8:
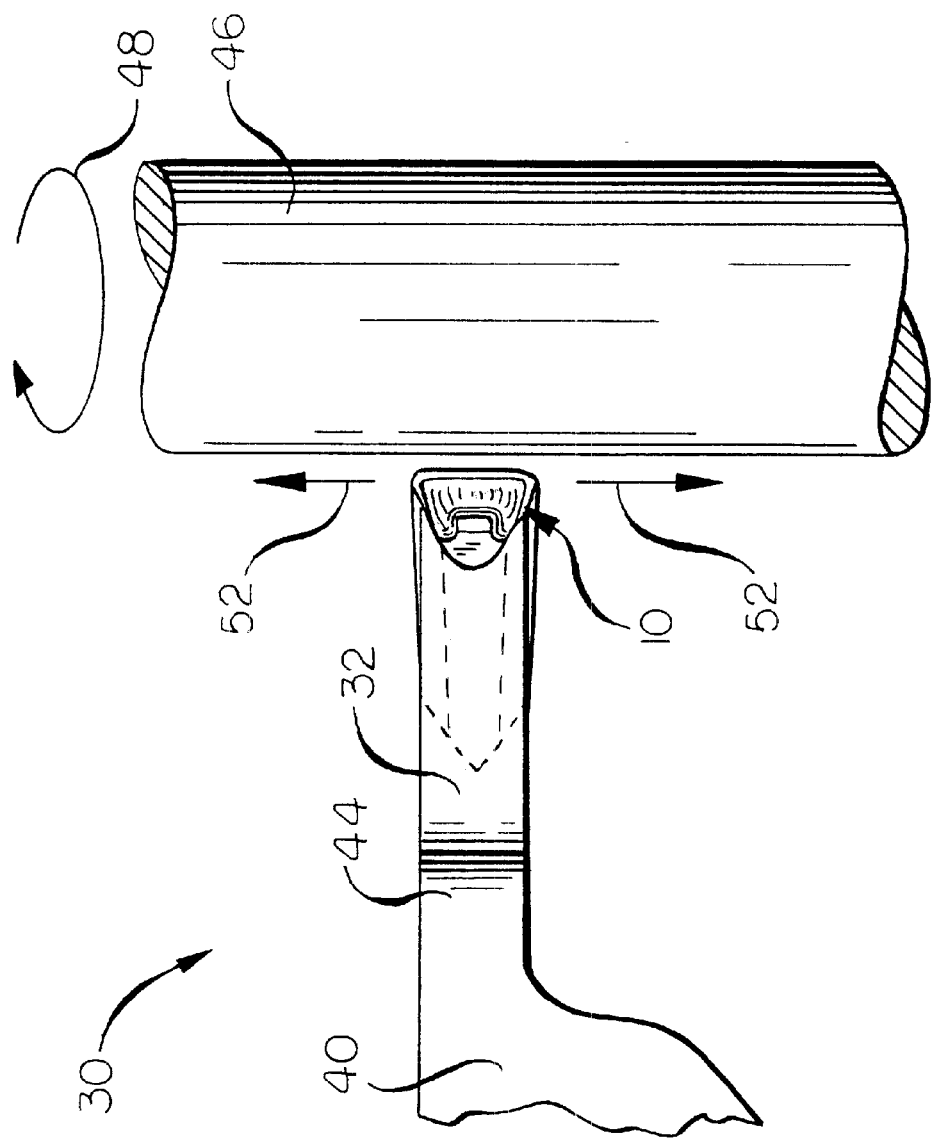

The tool holder 30 is designed for use in machining, for example, a cylindrical workpiece 46 that may be rotated by a workpiece holder (not shown) in the direction of the arrow 48 in FIG. 7. During a grooving or parting operation, the tool holder 30 moves in a radial or transverse direction with respect to the workpiece 46 (in the direction of the arrow 50 in FIG. 7). During a turning operation, the tool holder 30 moves in a lateral direction with respect to the workpiece 46 (in the direction of the arrow 52 in FIG. 8).

When the cutting insert 10 is used in a grooving or parting operation, the chip which is cut by the major cutting edges 22a, 22b is initially the width of the major cutting edges 22a, 22b. The chip then encounters and passes over the chip breaking faces 18a, 18b. As the leading, longitudinal edge of the chip passes over the chip breaking faces 18a, 18b, it then encounters the chip deflecting surfaces 26a, 26b which assist in curling and breaking the chip for disposal.

When the cutting insert 10 is used in a turning operation, the chips which are cut by the minor cutting edges 24a, 24b pass over the chip breaking faces 18a, 18b. The chip eventually encounters the chip deflecting surfaces 26a, 26b which causes the chip to acquire a corrugated cross-sectional shape that facilitates breakage for disposal.

It has been discovered that the working major cutting face 22a, 22b should be inclined at a presentation angle, designated at 54, of at least 25 degrees, and more preferably at least 30 degrees, with respect to the longitudinal axis of the insert 10, as best shown in FIG. 7. This is done so as to properly transmit the forces exerted on the insert 10 during the turning or grooving operation, thereby preventing premature damage to the insert 10.

Figure 9:
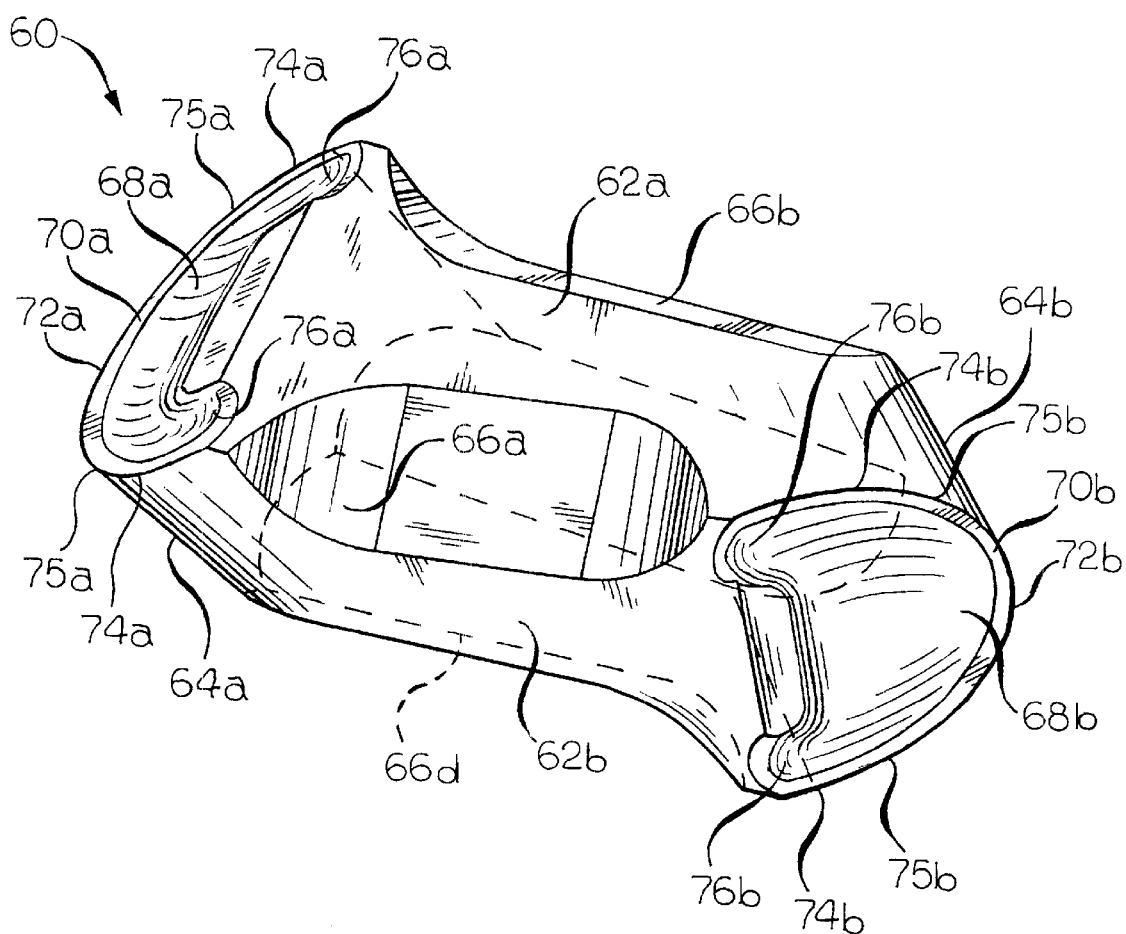
FIGS. 9–11 are perspectives view of another embodiment of the cutting insert in accordance with the invention.
Figure 10:
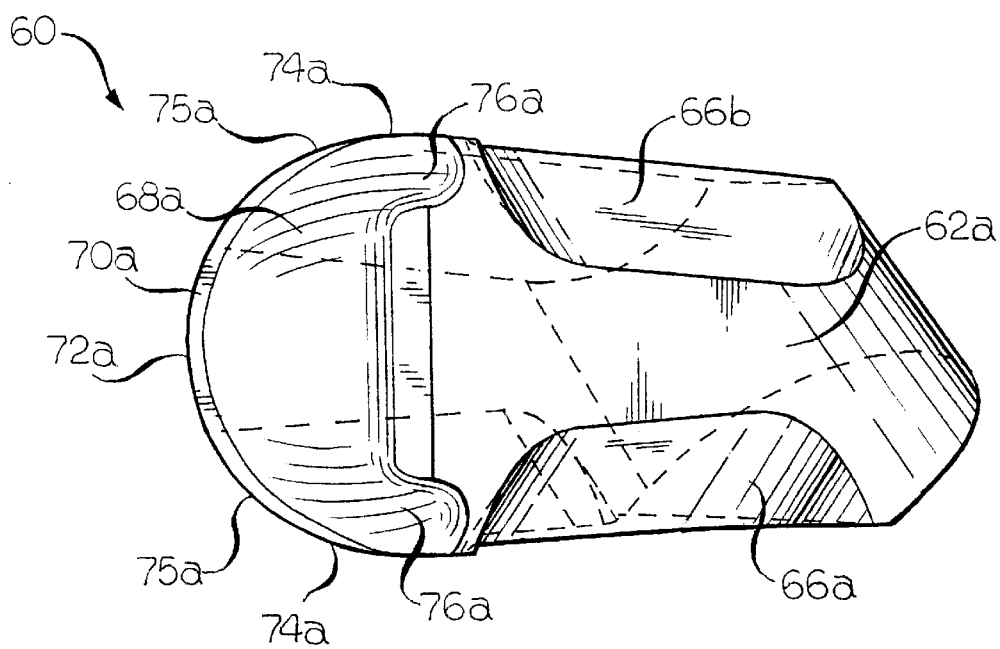
Figure 11:
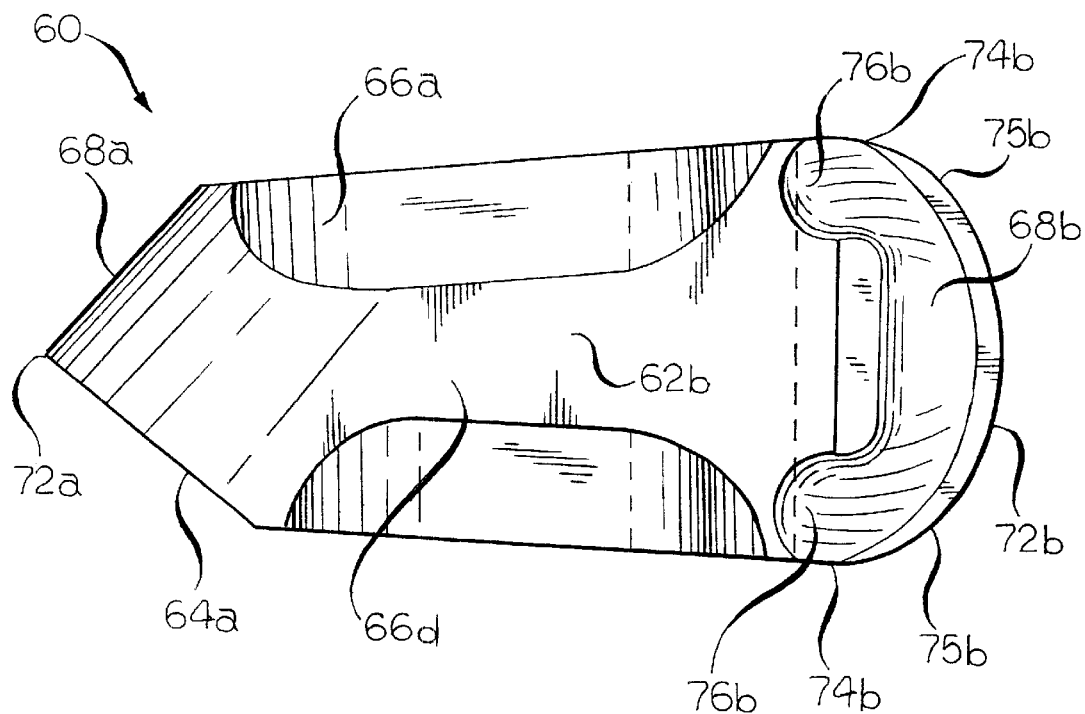

FIGS. 9–11 illustrate another embodiment of the cutting insert 60 of the invention. Similar to the cutting insert 10, the cutting insert 60 comprises a generally polygonal body having generally planar minor flank faces 62a, 62b, generally planar major flank faces 64a, 64b, generally planar seating/clamping faces 66a–d, generally curved chip breaking faces 68a, 68b, and generally planar first faces 70a, 70b.

At the intersection of the first faces 70a, 70b and the major flank faces 64a, 64b are formed major cutting edges 72a, 72b, respectively. The major cutting edges 72a, 72b are substantially identical construction. Unlike the cutting insert 10, the major cutting edges 72a, 72b of the cutting insert 60 are generally curvilinear. The major cutting edges 72a, 72b are formed approximately orthogonal to each other such that each major cutting edge 72a, 72b can be alternately exposed for use.

Formed at the intersection of the first faces 70a, 70b and the minor flank faces 62a, 62b are formed minor cutting edges 74a, 74b, respectively. A smooth transition area 75a, 75b is located between the generally curvilinear major cutting edges 72a, 72b and the generally linear minor cutting edges 74a, 74b. The minor cutting edges 74a, 74b extend from the smooth transition area 75a, 75b to an intermediate position along the insert 60. The minor cutting edges 74a, 74b are substantially coplanar with the major cutting edges 72a, 72b.

Each chip breaking face 68a, 68b includes upwardly rising chip deflecting surfaces 76a, 76b, respectively. As in the cutting insert 10, the chip deflecting surfaces 76a, 76b of the cutting insert 60 assist in curling and breaking the chip as the chip flows over the chip breaking face 68a, 68b.

Figure 12:
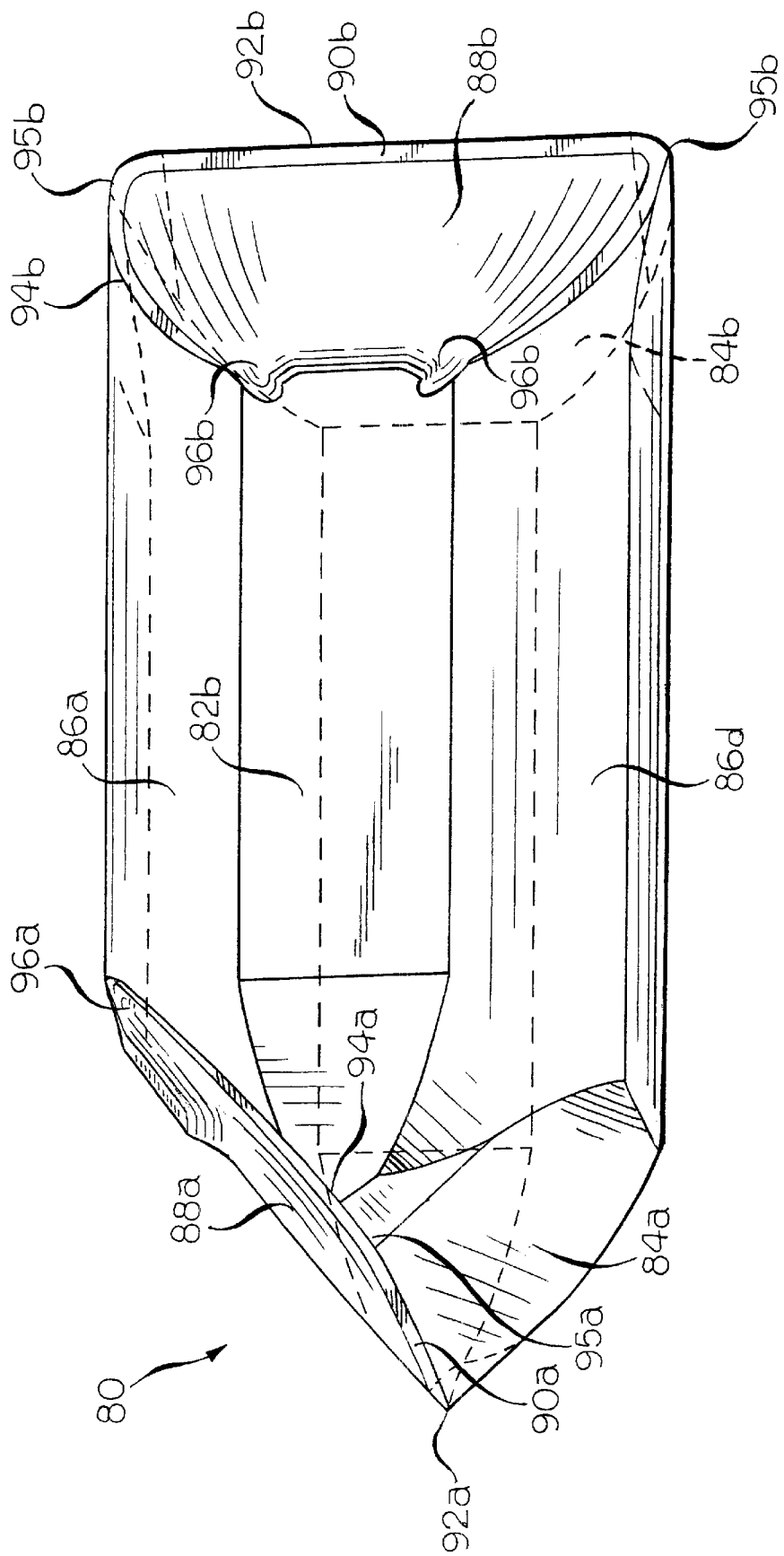
FIGS. 12–14 are perspectives view of yet another embodiment of the cutting insert in accordance with the invention.
Figure 13:
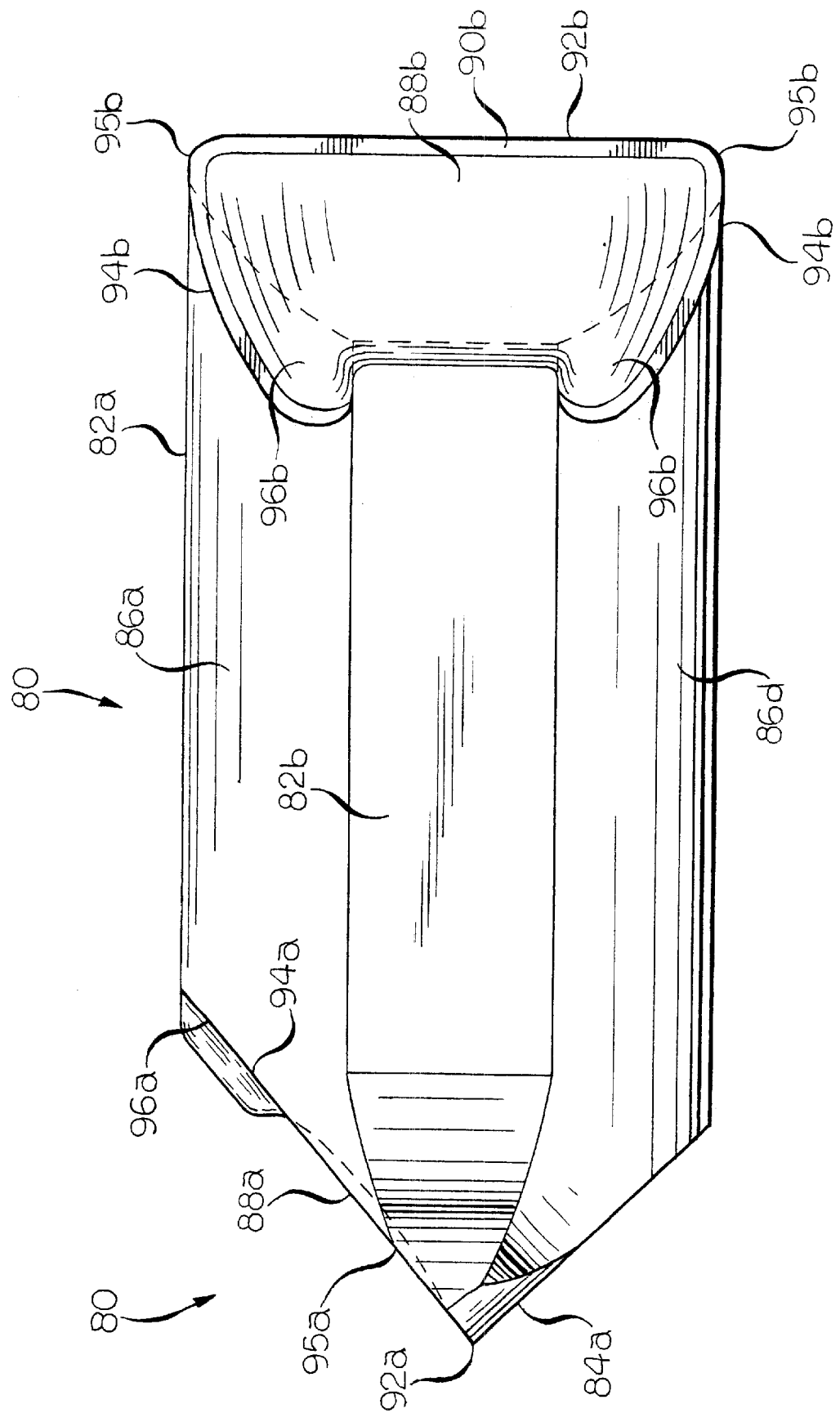
Figure 14:
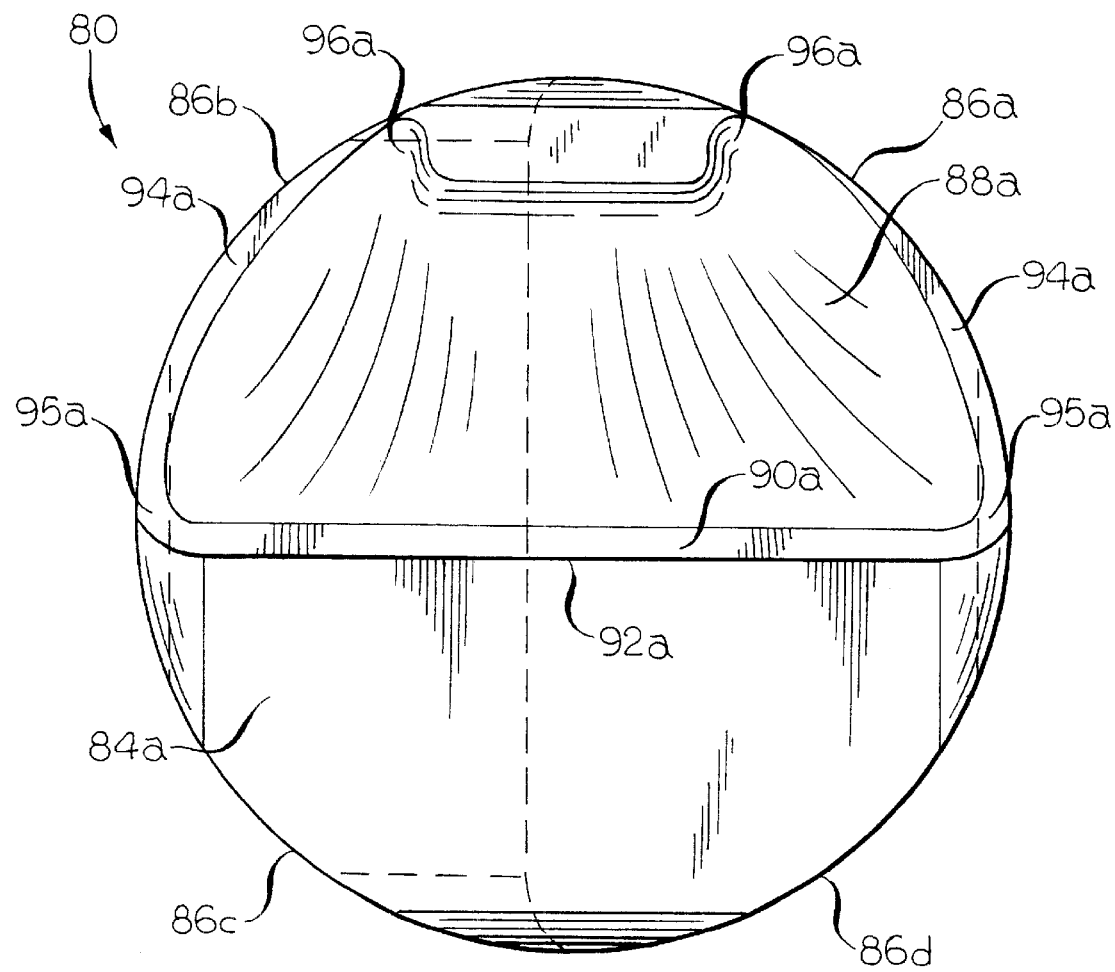

FIGS. 12–14 illustrate yet another embodiment of the cutting insert 80 of the invention. Similar to the cutting inserts 10 and 60, the cutting insert 80 comprises a generally polygonal body having generally planar minor flank faces 82a, 82b, generally planar major flank faces 84a, 84b, generally planar seating/clamping faces 86a–d, generally curved chip breaking faces 88a, 88b, and generally planar first faces 90a, 90b.

At the intersection of the first faces 90a, 90b and the major flank faces 94a, 94b are formed major cutting edges 92a, 92b, respectively. The major cutting edges 92a, 92b are substantially identical construction. Similar to the cutting insert 10, the major cutting edges 92a, 92b of the cutting insert 80 are generally linear and identical in construction. The major cutting edges 92a, 92b are formed approximately orthogonal to each other such that each major cutting edge 92a, 92b can be alternately exposed for use.

Formed at the intersection of the first faces 90a, 90b and the minor flank faces 92a, 92b are formed minor cutting edges 94a, 94b, respectively. The minor cutting edges 94a, 94b are generally linear. Corners 95a, 95b are located between the major cutting edges 92a, 92b and the minor cutting edges 94a, 94b. The corners 95a, 95b provide a smooth transition area between the generally linear major cutting edges 92a, 92b and the generally curvilinear minor cutting edges 94a, 94b. The minor cutting edges 94a, 94b extend from insert corners 95a, 95b to an intermediate position along the insert 80. The minor cutting edges 94a, 94b are substantially coplanar with the major cutting edges 92a, 92b.

Each chip breaking face 88a, 88b includes upwardly rising chip deflecting surfaces 96a, 96b, respectively. As in the cutting inserts 10 and 60, the chip deflecting surfaces 96a, 96b of the cutting insert 80 assist in curling and breaking the chip as the chip flows over the chip breaking face 88a, 88b.

While various embodiments of the invention are illustrated, the particular embodiments shown should not be construed to limit the claims. It is anticipated that various changes and modifications may be made without departing from the scope of this invention.

The documents, patents and patent applications referred to herein are hereby incorporated by reference.

What is claimed is:

1. A cutting insert, comprising:
   a generally polygonal body having minor flank faces, major flank faces, chip breaking faces between the minor and major flank faces, first faces between the major flank faces and the chip breaking faces, major cutting edges formed at the intersection of the first faces and the major flank faces, and minor cutting edges formed at the intersection of the first faces and the minor flank faces, wherein the chip breaking faces include chip deflecting surfaces extending away from the first faces and toward the minor flank faces, the chip deflecting surfaces assisting in curling and breaking chips as the chips flow over the chip breaking faces, and wherein the major cutting edges are substantially perpendicular to each other such that each major cutting edge can be alternately exposed for use.

2. The cutting insert according to claim 1, wherein the minor cutting edges are coplanar with the major cutting edges.

3. The cutting insert according to claim 1, further including corners located between the major cutting edges and the minor cutting edges.

4. The cutting insert according to claim 1, wherein each chip breaking face is generally curved.

5. The cutting insert according to claim 1, further including generally planar clamping faces bounded between the minor flank faces, the minor cutting edges, the chip breaking faces and at least one of the first faces.

6. The cutting insert according to claim 1, wherein both the major cutting edges and the minor cutting edges are generally linear.

7. The cutting insert according to claim 1, wherein the major cutting edges are generally curvilinear and wherein the minor cutting edges are generally linear.

8. A cutting tool, comprising:

a generally polygonal body having minor flank faces, major flank faces, chip breaking faces between the minor and major flank faces, first faces between the major flank faces and the chip breaking faces, major cutting edges formed at the intersection of the first faces and the major flank faces, and minor cutting edges formed at the intersection of the first faces and the minor flank faces, wherein the chip breaking faces include chip deflecting surfaces extending away from the first faces and toward the minor flank faces, the chip deflecting surfaces assisting in curling and breaking chips as the chips flow over the chip breaking faces, and wherein the major cutting edges are substantially perpendicular to each other such that each major cutting edge can be alternately exposed for use; and a tool holder including a pair of jaws having surfaces defining a retaining slot therebetween.

9. The cutting tool according to claim 8, wherein the minor cutting edges are coplanar with the major cutting edges.

10. The cutting tool according to claim 8, wherein the insert further includes corners located between the major cutting edges and the minor cutting edges.

11. The cutting tool according to claim 8, wherein each chip breaking face is generally curved.

12. The cutting tool according to claim 8, further including generally planar clamping faces.

13. The cutting tool according to claim 8, wherein both the major cutting edges and the minor cutting edges are generally linear.

14. The cutting tool according to claim 8, wherein the major cutting edges are generally curvilinear and wherein the minor cutting edges are generally linear.

* * * * *